3,272,782
DERIVED COPOLYMERIC SULFONES
John L. Lang, 42 Windgate Drive, Box 820—111,
Murrysville, Pa.
No Drawing. Filed July 16, 1962, Ser. No. 210,236
9 Claims. (Cl. 260—79.3)

This invention relates to derived copolymers prepared by the reaction of sulfur dioxide and ar-vinylidene α-haloalkyl aromatic compound interpolymeric systems with nucleophilic reagents, the products so prepared, and the uses thereof.

Conventional polymers and copolymers of ar-vinylidene α-haloalkyl aromatic compounds have been prepared, but have had the disadvantages of being relatively impermeable by, and thus being reluctant to react with many of the several nucleophilic reagents to make derived polymers, as well as being expensive.

These factors have limited the use of such derived polymers to applications wherein the resin was recoverable or otherwise reuseable, e.g., ion-exchange.

It is an object of this invention to provide a polymeric system having a more polar character than the heretofore available materials, and hence one being more permeable by a greater variety of nucleophilic reagents, and therefore providing a polymeric substrate more reactable with a greater variety of nucleophilic reagents, than has been heretofore possible.

A further object of this invention is to provide a means for the preparation of polymers of ar-vinylidene α-haloalkyl aromatic compounds at a rapid polymerization rate. This enables their preparation in the presence of water without an appreciable amount of hydrolysis, a side-reaction which, in many instances, can seriously decrease the yield of useable monomeric units in the polymeric product.

An additional object of this invention is to provide a process for preparing a copolymeric product having a plurality of bonding sites connecting the several functional loci which are relatively susceptible to bond cleavage, e.g., by bacteria or other biochemical means, than the heretofore available polymeric products which have extensive sequences of carbon-to-carbon bond linkages connecting such groups.

This degradable property is extremely advantageous in minimizing or eliminating the damage due to contaminational overloading of effluents treated with such polymers.

Another object of this invention is to provide a thermally degradable polymeric product comprising the reaction products of copolymers of sulfur dioxide and ar-vinylidene α-haloalkyl aromatic compounds with nucleophilic reagents, which property can be used to effect special transitory process-adjunct effects as well as the minimization or elimination of contamination of liquid effluents or treated solids after such operations as fluocculations, slime-coagulations, paper-making operations, waste disposal, ore-beneficiation, and others which use these products.

A still further object of this invention is to provide an economical means for the preparation of copolymers having valuable properties which enable them to be used as flocculating agents, slime-control agents, thickeners, textile sizes, bonding non-woven fabrics, adhesives, in tanning or otherwise treating proteinaceus materials suspending agents, clarifiers, chelating polymers, syndet scavengers, encapsulating agents, additives for cements and drilling muds, soil-conditioners, paper-pulping adjuncts, effluent water treatments, and many other applications.

Another object of this invention is to provide a polymeric product having a greater susceptibility to solvents, such as water, by reason of their more polar character than that of the heretofore available materials.

According to the invention, the aforementioned and related objects can be accomplished by the preparation of a copolymeric composition comprising sulfur dioxide, an ar-vinylidene α-haloalkyl aromatic compound, optionally in combination with other substances copolymerizable with this system, followed by reaction with a suitable nucleophilic reagent.

The substrate copolymeric sulfones produced from the aforementioned initial monomeric materials and sulfur dioxide, before reaction with the nucleophilic reagent(s) are merely additional examples of sulfone containing, hard-to-fabricate macromolecular materials, sharing these disadvantageous properties with the heretofore prepared poly-sulfone curiosities, but after these reactable copolymeric sulfones are treated with a suitable nucleophilic reagent, the converted solvent susceptible form has great utility in a host of applications.

These reactable copolymers may be prepared by the usual methods, and are particularly advantageously prepared by an emulsion or other dispersion technique, because these methods produce directly a polymer substrate in a finely divided form or even a latex, which facilitates the subsequent reaction with the nucleophile. In addition, the use of the emulsion polymerization technique permits the use of cross-linking agents to prepare the so-called "microgels" as well as taking advantage of the built-in redox initiation system, giving a rapid polymerization rate, permitting low temperature operation, minimizing deleterious side-reactions such as occurs upon prolonged or high temperature exposure of the ar-vinylidene-α-haloalkyl aromatic compound to water or other substances.

The reactive copolymers of this invention have utility in the form of the essentially linear or branched macromolecules, and also have certain enhanced properties for some applications when in the form of variable cross-linked, solvent-dispersible entities known as "microgels."

The process is adaptable for the preparation of both binary and multi-component copolymer substrates and derived copolymers.

In the selection of comonomers it is merely necessary that at least one of them be an ar-vinylidene α-haloalkyl aromatic compound, where the halogen is chlorine or bromine, and another be sulfur dioxide.

Except for the more rigidly fixed proportions of sulfur dioxide, the composition of the comonomeric components of these copolymeric substrates and their subsequent reaction products may be varied widely with respect to the ratio of the amount of ar-vinylidene-α-haloalkyl aromatic compound therein to the amount of therewith copolymerizable comonomer optionally present.

The composition of the copolymers of this invention is always such that there is incorporated in the copolymer less than 45 percent sulfur dioxide.

The ar-vinylidene-α-haloalkyl aromatic compounds which can be used as comonomers in preparation of the substrate copolymers are those types represented by the formula:

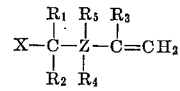

wherein Z is an aromatic nucleus; X is a halogen selected from the class consisting of chlorine and bromine; $R_1$ and $R_2$ are individually selected from the class consisting of hydrogen and lower alkyl radicals; $R_3$ is selected from the class consisting of hydrogen and methyl; and $R_4$ and $R_5$ are individually selected from the class consisting of hydrogen, chlorine, bromine and lower alkyl radicals. The method of preparing the ar-vinylidene-α-halo-alkyl aromatic compounds is described in U.S. Patent No. 2,780,604.

Examples of such compounds are ar-vinyl benzyl chloride, ar-vinyl benzyl bromide, ar-isopropenyl benzyl-chloride and -bromide, ar-(1-chloromethyl)-ar-vinyl toluene, ar-(1-bromomethyl) - ar - vinyl toluene, ar-(1-chloromethyl)-ar-vinyl naphthalene, ar-(1-chloromethyl)-ar-vinyl-ar-chlorobenzene, ar-(1-chloromethyl)-ar-vinyl-ar, ar-dichlorobenzene and the like, or mixtures thereof.

In the preparation of ternary and other multi-component systems, one or more comonomers may be selected from a wide variety of copolymerizable substances.

Examples of comonomeric materials which may be employed as added components to the ar-vinylidene-α-haloalkyl aromatic compound-sulfur dioxide system include such monomers and their equivalents as styrene, α-methyl styrene, chlorostyrene, dichlorostyrenes, vinyl toluene, vinyl xylene, vinyl cumene, tert-butyl styrene, vinylidene chloride, vinylidene chloride-bromide, butadiene, butene-1, acrylonitrile, and the like, and mixtures thereof.

The proportions of comonomers used can be varied within wide limits, producing copolymers having characteristic properties dependent upon the comonomer types and proportions.

When dispersibility in water is a requisite, at least 20% by weight of ar-vinylidene-α-haloalkyl aromatic compound is needed to produce copolymers capable of being reacted with a suitable nucleophilic reagent to produce a derived polymer with the thus specified solubility characteristics.

If a cross-linked polymeric substrate, such as a "microgel" is desired, a cross-linking agent such as divinyl benzene, or a solution thereof in ethyl vinyl benzene and/or diethylbenzene, or trivinyl benzene-containing material or other (polyvinylidene) compound, aromatic or equivalent, can be added to form the required three-dimensionally netted substrate copolymer. When such "microgel" substrates are desired, it is advantageous to prepare the copolymer by an emulsion polymerization technique.

The sulfone copolymer substrates can be reacted with an array of nucleophilic reagents, thus producing valuable polymeric flocculating agents, polyelectrolytes, etc. Examples of such reagents are trimethylamine, dimethyl amine, thiourea, urea, dimethyl sulfide, mono-, di- and tri- alkyl amines, hydrogen sulfide, ammonia, iminodiacetic acid, sarcosine pyridine, morpholine, the picolines, 2,4-lutidine, quinoline and isoquinoline, dioxane, water, carbenyls, mercaptans, ethers, iodoso compounds, aniline, sulfite salts and their equivalents and mixtures thereof.

Sequencing of nucleophiles may be used to facilitate reaction of certain of these nucleophilic reagents when solubility or compatibility considerations make this technique desirable or required.

The reaction of the copolymer substrates with nucleophilic reagents can be carried out in the absence of, or presence of, solvents or dispersants.

Examples of such materials are water, alcohols, solvents for the substrate copolymer, such as trichloroethylene, solvents for the reacted product, or solvent mixtures which can be selected to cause simultaneous reaction and separation, in suitable form, of the final reacted copolymeric product.

The substrate copolymers, when reacted with a suitable nucleophilic reagent, can be converted to water soluble macromolecules. In the case of cross-linked macromolecules, such as the "microgel" types, these reacted copolymers form water-swellable gels, which when sufficiently small, are water dispersible, and can be made so as to be indistinguishable from ordinary "true" solutions, as far as visual inspection can ascertain. They can be distinguished from "true" solutions of linear or branched molecules by more subtle means, of course, but for many applications they are for all practical purposes "water soluble." For this reason, the derived copolymeric products of this invention are termed variously as "water dispersible" and/or "water soluble," "soluble" or "dispersible," disregarding these subtle differences.

The process of the invention and the copolymeric products resulting therefrom will become more apparent from a perusal of the following examples, which are meant to be merely illustrative, and must not be construed in any way as limiting the invention.

*Example I*

An emulsifier solution was prepared by combining 200 parts by weight of de-ionized water, 0.48 part by weight of potassium persulfate, and 4.0 parts by weight of Sulfon-ate AA10, a proprietary brand for a technical grade of alkyl benzene sulfonic acid: sodium salt. This mixture was placed in a crown-sealable, pressure-resistant glass bottle, together with 6.0 parts by weight of ar-vinyl benzyl chloride. The contents of the bottle were then frozen by swirling in a freezing bath of carbon dioxide snow. This swirling was done in such a manner so as to coat the lower interior walls of the bottle with the frozen contents thereof, serving to prevent straining, cracking or breaking the bottle by the freezing aqueous portion.

When the whole was cooled well below 0° C., an amount of sulfur dioxide in excess of 23.22 parts by weight was weighed into the bottle, and the excess allowed to boil off, until the correct indicated weight remained.

The bottle was then sealed by emplacement and crimping thereon as "Teflon" foil-lined crown seal by customary techniques. The boiling off of the excess sulfur dioxide served to purge the atmosphere in the polymerization bottle and exclude unwanted gases from the space above the liquid polymerization charge.

The bottle was warmed to room temperature, placed in a water-filled thermostatically controlled tumbling bath, whose temperature was regulated at 40° C. After 40 hours of agitation therein, the sample was removed, cooled, pressure relieved, and the remaining sulfur dioxide removed by vacuum stripping.

A small portion of the latex was precipitated, and the solid polymer so obtained was analyzed, with the following results:

| | Percent |
|---|---|
| Chlorine | 16.72 |
| Total sulfur | 8.62 |
| Inorganic sulfur | 1.28 |

These values correspond to those of a 2:1 mole ratio copolymer of ar-vinyl benzyl chloride and sulfur dioxide. The inorganic sulfur represents the remains of reaction products of the persulfate portion of the copolymerization initiator system, oxidation products of sulfur dioxide or sulfite ion, and its value was deducted from the total sulfur value in the calculation of the copolymer composition.

The latex was divided into several parts, and one of these portions was reacted with an appropriate amount of 28% aqueous trimethyl amine. After shaking the aforementioned mixture for a short period, during which the reaction took place, the white, opaque, mobile substrate copolymer latex became converted to a greenish-yellow, transparent, exceedingly viscous "solution" of a polyelectrolyte, whose main constituent was an ar-vinyl benzyl trimethyl ammonium chloride-sulfur dioxide copolymer.

A portion of this water dispersible polyelectrolyte was diluted to 0.1% by weight with water, and 1 drop of this solution placed in one sample of two equal volumes of identical (ca. 5%) kaolin-in-water suspension, both contained in 100 ml. graduates. The cylinders containing the individual samples, treated and untreated kaolin suspension, were closed, inverted and reverted simultaneously, and then allowed to stand undisturbed. The treated kaolin suspension became aggregated to large flocks of coalesced kaolin particles, which settled with visible noticeable velocity, whereas the untreated suspension was an essentially unchanged, practically homogeneous slurry of miniscule kaolin particles, for the most part unresolvable by the eye as individual bodies, which slowly settled over a period of hours.

A further portion of the substrate copolymer was suspended in isopropanol, and treated with an appropriate amount of 28% aqueous trimethyl amine solution. This treatment converted the sulfone copolymer to a water dispersible polyelectrolyte, which was "soluble" and ionized over an extensive range of pH and which, when present in very low concentration, caused the accelerated flocculation of slimes and suspensions, such as a kaolin slip, when treated in the manner as described above.

*Example II*

A copolymer was prepared using the same procedural steps as given in Example I, except that 16.95 parts by weight of sulfur dioxide was in the initial polymerization charge. After polymerization, a portion of the substrate copolymer was precipitated, and the dry solid copolymer analyzed. This analysis showed that this copolymer contained 18.56% chlorine, 7.49% total sulfur, and 0.01% inorganic sulfur, again corresponding to a copolymer of 2 moles of ar-vinylbenzyl chloride with 1 mole of sulfur dioxide.

Treatment of the latex, the dried solid, or other forms of copolymer with approximately equivalent amounts of trimethylamine produced a water dispersible polyelectrolyte which can be used as a thickener, slime control agent, flocculant, etc.

*Example III*

An experiment was carried out in the same manner as described in Example I, except that 0.0143 part by weight of a 58% solution of divinylbenzene in an ethyl vinyl benzene-diethyl benzene mixture was added to the polymerization vessel before the freezing step. Polymerization produced a "microgel" sulfone copolymer, a lightly cross-linked, multi-component copolymer, which was reacted with an appropriate amount of trimethyl amine. The thus-produced, transparent, light yellow solution-resembling dispersion contained a "microgel" polyelectrolyte whose main constituent was a copolymer of vinyl benzyl trimethyl ammonium chloride with sulfur dioxide. This polyelectrolyte exhibited the ability to promote the flocculation of slimes and suspensions.

A portion of this copolymer substrate was treated with dimethyl sulfide. This nucleophilic reagent reacted to produce another polyelectrolyte which was a copolymer containing mainly sulfur dioxide, vinyl benzyl dimethyl sulfonium chloride, divinyl benzene and ethyl styrene.

*Example IV*

Into a pressure-resistant bottle was placed 200 parts by weight of de-ionized water, 0.48 part by weight of potassium persulfate, 4.0 parts by weight of a mixture of 2 parts by weight of "Duponol ME" a proprietary brand of technical grade sodium lauryl sulfate and 2 parts by weight of "Sul-fon-ate AA10," a proprietary brand of alkyl benzene sulfonic acid: sodium salt. Then 0.0143 part by weight of a solution containing 58% divinyl benzene in an ethyl styrene-diethyl benzene mixture, 45 parts by weight of styrene, and 15 parts by weight of ar-vinyl benzyl chloride were added.

This mixture was frozen in carbon dioxide snow, rotating the bottle in the manner described above.

When cold enough, a quantity of liquid sulfur dioxide was introduced, and the excess allowed to boil away until 16.95 parts by weight remained in the bottle. The container was then sealed with a "Teflon" foil-lined crown-type seal, allowed to warm to room temperature, and polymerized at 40° C. for 40 hours.

The vessel and contents were then cooled, pressure relieved, and degassed. The latex so produced was reacted with a suitable nucleophilic reagent, trimethyl amine, to form a water dispersible polyelectrolyte, even though it contained a minor amount of ionizable comonomeric unit. This polyelectrolyte was capable of flocculating slimes and suspensions.

*Example V*

A comonomeric solution of 12.0 parts by weight of benzene, 48.0 parts by weight of ar-vinyl benzyl chloride, 0.005 part by weight of benzoyl peroxide and 10.1 parts by weight of sulfur dioxide was prepared, sealed, and polymerized at 50° C. for 48 hours. The resulting mixture was degassed, the copolymeric product recovered, slurried with isopropanol, and reacted with an appropriate amount of 28% aqueous trimethyl amine. This treatment converted this copolymeric sulfone substrate macromolecular material to a water dispersible polyelectrolyte, which can be used as a thickener, flocculant, oil well mud treating agent, etc.

Various modifications may be made in the present invention without departing from the spirit or scope thereof and it is to be understood that I limit myself only as defined in the appended claims.

I claim:

1. A water-dispersible polyelectrolyte produced by reacting a nuclophilic reagent with a copolymer including repeating units of

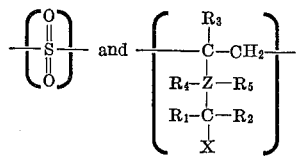

wherein

Z is an aromatic nucleus,

X is a halogen selected from the class consisting of chlorine and bromine, $R_1$ and $R_2$ are individually selected from the class consisting of hydrogen and lower alkyl radicals, $R_3$ is selected from the class consisting of hydrogen and methyl, and $R_4$ and $R_5$ are individually selected from the class consisting of hydrogen, chlorine, bromine and lower alkyl radicals; and wherein at least a portion of the

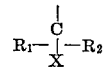

groups are reacted with said nucleophilic reagent, the reaction being carried out at a temperature and pressure which will preclude decomposition of the copolymer.

2. The polyelectrolyte of claim 1 wherein said nucleophilic reagent is selected from the class consisting of ammonia, monoalklamines, dialkylamines, trialkylamines, urea, thiourea, ethers, hydrogen sulfide, dialkyl sulfide, the picolines, quinoline, isoquinoline, 2,4-lutidine, iminodiacetic acid, sarcosine, pyridine, morpholine, dioxane, carbonyls, mercaptans, iodoso compounds, sulfite salts of alkali metals and aniline.

3. The polyelectrolyte of claim 1 wherein said copolymer is formed by the addition copolymerization of sulfur dioxide,

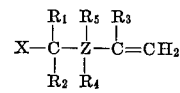

and at least one copolymerizable monomer.

4. The polyelectrolyte of claim 3 wherein said monomer is selected from the class consisting of styrene, α-methylstyrene, chlorostyrene, dichlorostyrenes, vinyl toluene, vinyl xylene, vinyl cumene, tert-butyl styrene, vinylidine chloride, vinylidene chloride-bromide, divinyl benzene, trivinyl benzene, and mixtures thereof.

5. The process for preparing a water-dispersible polyelectrolyte comprising copolymerizing (a) sulfur dioxide and (b) a monomer having the general formula

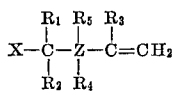

wherein:

Z is an aromatic nucleus,

X is a halogen selected from the class consisting of chlorine and bromine, $R_1$ and $R_2$ are individually selected from the class consisting of hydrogen and lower alkyl radicals, $R_3$ is selected from the class consisting of hydrogen and methyl, and $R_4$ and $R_5$ are individually selected from the class consisting of hydrogen, chlorine, bromine and lower alkyl radicals; and reacting the resulting copolymer with a nucleophilic reagent.

6. The process of claim 5 wherein said nucleophilic reagent is selected from the class consisting of ammonia, monoalkylamines, dialkylamines, trialkylamines, urea, thiourea, ethers, hydrogen sulfide, dialkyl sulfide, the picolines, quinoline, isquinoline, 2,4-lutidine, iminodiacetic acid, sarcosine, pyridine, morpholine, dioxide, carbonyls, mercaptans, iodoso compounds, sulfite salts of alkali metals and aniline.

7. The process for preparing a water-dispersible polyelectrolyte comprising copolymerizing sulfur dioxide and ar-vinyl benzyl chloride; and reacting the resulting copolymer with a nucleophilic reagent.

8. The process for preparing a water-dispersible polyelectrolyte comprising copolymerizing sulfur dioxide and air-vinyl benzyl chloride, and reacting the resulting copolymer with trimethylamine.

9. The process for preparing a water-dispersible polyelectrolyte comprising copolymerizing sulfur dioxide and ar-vinyl benzyl chloride, and reacting the resulting copolymer with dimethylsulfide.

References Cited by the Examiner

UNITED STATES PATENTS

| | | | |
|---|---|---|---|
| 2,572,185 | 10/1951 | Noether et al. | 260—79.3 |
| 2,645,631 | 7/1953 | Crouch et al. | 260—79.3 |

JOSEPH L. SCHOFER, *Primary Examiner.*

WILLIAM H. SHORT, *Examiner.*

J. F. McNALLY, F. L. DENSON, *Assistant Examiners.*